June 28, 1955  J. MARTIN  2,711,870
RIP CORD FOR PARACHUTE PACKS
Filed Nov. 3, 1952
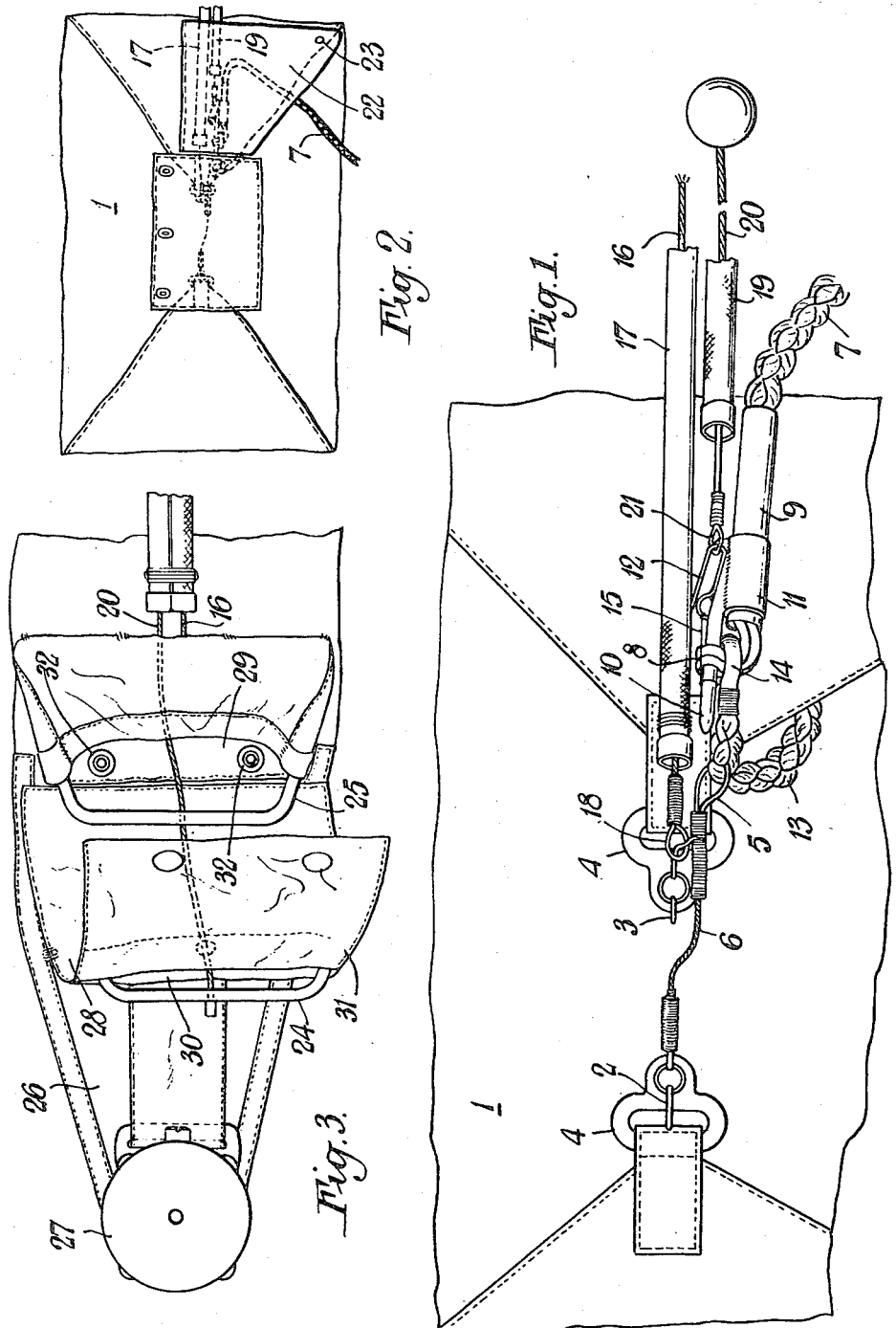
INVENTOR:
JAMES MARTIN
by Worth Wade
ATTORNEY United States Patent Office 2,711,870
Patented June 28, 1955

2,711,870

RIP CORD FOR PARACHUTE PACKS

James Martin, Higher Denham, near Uxbridge, England

Application November 3, 1952, Serial No. 318,398

3 Claims. (Cl. 244—149)

The present invention relates to improvements in and relating to parachute pack arrangements and allied parts for use by airmen.

With certain ejector seats, for example the seat described in the pending application for Patent Ser. No. 305,951, filed August 23, 1952, certain modifications are required in the standard parachute pack and allied parts in order that the main parachute may be automatically withdrawn from the pack on the seat being ejected from the aircraft, the withdrawal being effected as for example by connections leading from the seat drogue parachute to the said main parachute as described in the application aforesaid.

It is also necessary that means are available to allow the airman to break this coupling connection so that in the event of any breakdown in the sequence of automatic ejection, or indeed, even before the ejection sequence is initiated, the airman has freedom of action, to detach himself and the main parachute from the seat. This is referred to later as a manual override. There is also a rip cord device so that an airman after actuating the manual override can pull out the main parachute.

The invention is directed to the construction of the parachute pack per se, and to an improved construction of harness component per se, for receiving the actuating handles of the manual override and the rip cord handle device, and also in the combination of parts.

The acompanying drawings illustrate embodiments of the invention.

Fig. 1 is a plan view of that part of a parachute pack with which the invention is concerned.

Fig. 2 a detail view of the parachute pack showing a protective flap, and

Fig. 3 a side elevation of a harness component with the invention applied thereto.

The parachute pack 1 is provided with two release pins 2 and 3 normally engaging the usual coned closures 4 of the flaps of the pack. One of the release pins 3 is extended to form a loop or eye 5 and the other release pin is connected to the first mentioned pin by a flexible connection 6.

An automatically operated line 7 from the apron or sling or some other actuating means described in the application mentioned above terminates in a loop 8 and adjacent this loop and on the line is a sleeve 9 which may be a plastic sleeve.

On this sleeve 9 there slides freely a connecting pin 10. The pin is mounted on a second sleeve 11 which slides on the first mentioned sleeve 9. Superimposed on this pin is a spring hook 12.

A line 13 attached at one end inside the pack to the top of the main parachute canopy emerges from the pack to pick up the eye or loop 5 of the pack release pins and finally terminates in a stiffened loop 14. Through this loop is threaded the loop 8 of the line 7 from the apron or sling or other actuating means. This latter loop is retained by the freely sliding connecting pin before mentioned. A breakable cotton tie 15 normally holds the connecting pin 10 in position.

As stated in the prior application there is now a continuous line from the seat drogue parachute to the top or apex of the main parachute.

The standard rip cord 16, which passes through a suitable conduit 17, is modified by substituting for the conventional pins a small eye 18 which engages one of the new forms of pack release pins.

The manual ovverride referred to previously comprises a flexible conduit 19 running parallel, or substantially parallel, to the rip cord conduit 17. Through the first conduit runs a cable 20 terminating in a small eye 21 which engages the spring hook 12 on the connecting pin.

To protect the connecting pin and other parts and keep the lines in correct position there is provided a leather flap 22, for example, of triangular shape, which is sewn to the appropriate pack flap parallel, or substantially so, to the rip cord conduit or housing and secured at the outer corner or edge by a suitable fastener, for example, a snap fastener 23.

When the lifting line 7 is automatically operated a pull is exerted on the sleeves 9 and 11 and the spring hook 12 is disengaged from the loop or eye 21 of the manual override cable 20, the parachute release pins 2 and 3 are drawn out from the usual coned closures one pin passing through the rip cord eye or loop 18 so that the parachute is free to be withdrawn automatically from the pack. In the event of the airman having to actuate the manual override he would pull the cable 20. This would cause the connecting pin 10 on the second sleeve 11 to break the tie 15 and to slide along the first sleeve 9 thus withdrawing the connecting pin from the loop 8 of the cable 7 and allow this loop to disengage from the loop 14 on the line 13 attached to the parachute canopy. The airman would then pull the rip cord 16, the eye on loop 18 thereon pulling out the release pins 2 and 3 and becoming disengaged therefrom leaving the parachute free to develop in the ordinary way. It will be understood that the parachute is at all times attached to the parachute harness worn by the airman.

Now dealing with the safety harness component.

The cable 20 of the manual override at its end remote from the parachute pack has a ball or D ring handle 24.

The rip cord 16 at the end remote from the parachute pack has a handle 25 such as a D ring handle.

These handles are mounted on a component 26 of the harness adjacent the harness box 27.

For the purpose of ensuring that the manual override is operated before pulling the rip cord, the mounting is as follows:

The harness component is provided with two pockets, 28 and 29, the pocket 28 for the manual override handle and the other 29 for the rip cord handle.

The outer end of the rip cord handle projects from the pocket 29 into which it is fitted, and the outer end of the manual override handle projects through a slot 30 from the pocket into which it is fitted. The manual override pocket has a flap 31 which is folded over to conceal normally the outer end of the rip cord handle. This flap when folded over is retained in that position by suitable fastening means, for example two snap fasteners 32.

When the override handle is pulled to disconnect the parachute from its attachment to the apron or sling, the flap is released to uncover the rip cord handle to enable the airman at the appropriate time to pull out the main parachute in the normal manner.

It will be apparent that the invention can be variously modified and changed within the scope of the appended claims.

I claim:

1. A harness component for a parachute pack arrangement having a manual override control and a rip cord device, said component being provided with two pockets, one for a handle of the manual override control and the other for a handle of the rip cord device, and means on the manual override pocket normally concealing the said rip cord device handle.

2. In a parachute pack having overlapping flaps and co-operating coned closures and a parachute in said pack, two release pins normally engaging said closures, a connection between the pins, a line attached at one end to the parachute, a loop on one release pin through which the line passes, a loop on the end of the line remote from the parachute, an automatically operated line, a sleeve through which the line passes, a loop at the end of the automatically operated line which loop is threaded through the loop on the first mentioned line, a second sleeve sliding on the first sleeve, a pin on the second sleeve engaging the loop on the automatically operated line when this has been passed through the loop of the line attached to parachute, a breakable tie normally retaining the pin 20 against withdrawal, a hook on said pin, a manual override cable engaging the hook and a rip cord detachably engaging one of the release pins, whereby the parachute is withdrawn from the pack on actuation of the automatically operated line or by actuation of the manual override control.

3. In a parachute pack having overlapping flaps and co-operating coned closures and a parachute in said pack, two release pins normally engaging said closures, a connection between the pins, a line attached at one end to the parachute, a loop on one release pin through which the line passes, a loop on the end of the line remote from the parachute, an automatically operated line, a sleeve through which the line passes, a loop at the end of the automatically operated line which loop is threaded through the loop on the first mentioned line, a second sleeve sliding on the first sleeve, a pin on the second sleeve engaging the loop on the automatically operated line when this has been passed through the loop of the line attached to parachute, a breakable tie normally retaining the pin against withdrawal, a hook on said pin, a manual override cable engaging the hook, a rip cord detachably engaging one of the release pins, a harness component, two pockets therein, one for a handle of the manual override control and the other for a handle of the rip cord, and means on the manual override pocket normally concealing the said rip cord handle.

References Cited in the file of this patent
UNITED STATES PATENTS

| | | |
|---|---|---|
| 2,384,651 | Smith | Sept. 11, 1945 |
| 2,439,318 | Quilter | Apr. 6, 1948 |

FOREIGN PATENTS

| | | |
|---|---|---|
| 268,498 | Great Britain | Apr. 7, 1927 |